(12) United States Patent
Fung et al.

(10) Patent No.: US 7,134,092 B2
(45) Date of Patent: Nov. 7, 2006

(54) GRAPHICAL USER INTERFACE METHOD AND APPARATUS

(75) Inventors: Caleb Fung, New York, NY (US); Gary Natsume, Brooklyn, NY (US); John Humphrey, Brooklyn, NY (US)

(73) Assignee: James Nolen, King of Prussia, PA (US)

( * ) Notice: Subject to any disclaimer, the term of this patent is extended or adjusted under 35 U.S.C. 154(b) by 823 days.

(21) Appl. No.: 09/851,467

(22) Filed: May 8, 2001

(65) Prior Publication Data
US 2004/0066411 A1    Apr. 8, 2004

Related U.S. Application Data

(60) Provisional application No. 60/247,596, filed on Nov. 13, 2000.

(51) Int. Cl.
*G06F 3/00* (2006.01)

(52) U.S. Cl. .................. 715/779; 715/835; 715/739

(58) Field of Classification Search ............. 715/854, 715/835, 808, 810, 841, 863, 779; 725/38–61
See application file for complete search history.

(56) References Cited

U.S. PATENT DOCUMENTS

| | | | | |
|---|---|---|---|---|
| 5,670,984 A * | 9/1997 | Robertson et al. | ......... | 345/585 |
| 5,678,015 A * | 10/1997 | Goh | ......... | 715/782 |
| 5,684,511 A * | 11/1997 | Westerink et al. | ......... | 345/157 |
| 5,689,287 A * | 11/1997 | Mackinlay et al. | ......... | 345/427 |
| 5,689,677 A | 11/1997 | MacMillan | ......... | 395/433 |
| 5,701,424 A * | 12/1997 | Atkinson | ......... | 715/808 |
| 5,706,448 A * | 1/1998 | Blades | ......... | 715/834 |
| 5,790,820 A * | 8/1998 | Vayda et al. | ......... | 715/834 |
| 5,798,752 A * | 8/1998 | Buxton et al. | ......... | 715/863 |
| 5,828,360 A * | 10/1998 | Anderson et al. | ......... | 715/834 |
| 5,926,178 A * | 7/1999 | Kurtenbach | ......... | 715/834 |
| 5,940,076 A * | 8/1999 | Sommers et al. | ......... | 715/834 |
| 6,002,403 A * | 12/1999 | Sugiyama et al. | ......... | 715/717 |
| 6,011,553 A * | 1/2000 | Komiyama | ......... | 715/839 |
| 6,078,326 A * | 6/2000 | Kilmer et al. | ......... | 715/834 |
| 6,118,427 A * | 9/2000 | Buxton et al. | ......... | 345/629 |
| 6,215,490 B1 * | 4/2001 | Kaply | ......... | 715/788 |
| 6,297,798 B1 * | 10/2001 | Evans et al. | ......... | 715/856 |
| 6,359,635 B1 * | 3/2002 | Perttunen | ......... | 715/834 |
| 6,448,987 B1 * | 9/2002 | Easty et al. | ......... | 715/834 |
| 6,515,689 B1 * | 2/2003 | Terashima | ......... | 715/856 |

(Continued)

OTHER PUBLICATIONS

Screen Dumps of Microsoft Word 2000 (pp. 1-4, 1999).*

(Continued)

*Primary Examiner*—Kristine Kincaid
*Assistant Examiner*—Ryan Pitaro
(74) *Attorney, Agent, or Firm*—Synnestvedt & Lechner LLP

(57) ABSTRACT

The present invention comprises a graphical user interface tool particularly adapted for use with a program that shows multiple files simultaneously, each in a different panel of the display. The tool presents the user with a series of optional actions that can be taken in connection with the file that is displayed within one panel of the display. In accordance with the invention, a user manipulates a cursor to a position in one of the multiple panels on a display screen and issues an instruction to invoke the tool, such as by clicking on the right mouse button. The tool is then made to appear and displays a series of optional operations from which the user may select. The operations are specific to the file in the panel within which the tool was invoked.

28 Claims, 9 Drawing Sheets

U.S. PATENT DOCUMENTS

| | | | | |
|---|---|---|---|---|
| 6,549,219 B1 * | 4/2003 | Selker | ................... | 715/834 |
| 6,636,197 B1 * | 10/2003 | Goldenberg et al. | ........ | 345/156 |
| 6,677,965 B1 * | 1/2004 | Ullmann et al. | ............ | 715/786 |
| 6,795,097 B1 * | 9/2004 | Yamaguchi et al. | ........ | 715/817 |
| 2004/0034801 A1 * | 2/2004 | Jaeger | ................... | 713/202 |

OTHER PUBLICATIONS

Kurtenbach, G. & Buxton, W. (1993) The limits of expert performance using hierarchic marking menus. Proceedings of InterCHI '93, 482-487.

* cited by examiner

GRAPHICAL USER INTERFACE METHOD AND APPARATUS

RELATED APPLICATION

This application claims priority to and herein incorporates by reference U.S. provisional patent application No. 60/247,596 filed Nov. 13, 2000.

FIELD OF THE INVENTION

The invention pertains to graphical user interface tools for allowing a person to interact with a computer program. More particularly, the invention pertains to a method and apparatus for allowing a human user to interface with the World Wide Web using Web browser software.

BACKGROUND OF THE INVENTION

By now, almost everyone is familiar with the Internet and the World Wide Web (Web). The Internet is a collection of interconnected communication networks that together span the globe. Information content on the Internet is presented via pages, each page comprising one or more files that are stored on a computer server that is coupled to the Internet. Each page is assigned a Uniform Resource Locator (URL), which is essentially an address on the Internet identifying the server and the particular file on that server. These pages are accessible to anyone with access to a computer coupled to the Internet and who knows (or at least can determine, for instance, via a search engine) the URL of the particular page of interest. Most pages on the Web are, not only directly accessible, but also accessible via other pages on the Internet through a protocol termed hypertext transfer protocol (HTTP). Hypertext Markup Language (HTML) is a computer language generally used to describe how pages are organized, formatted, and linked together via the Internet. Other languages are known and are being developed also.

Web browsers are computer programs that understand HTTP and HTML and enable one to access and view Web pages via direct addressing (typing the address of a Web page in an address field) and/or by hyperlinking as described above. Netscape Navigator and Microsoft Explorer are the two most common Web browser software packages in use today. These Web browsers generally load and display a single page on the computer screen at any given time. When a Web browser links to that page, the browser software loads and displays that page.

In HTTP, pages on the Web may be interconnected via hyperlinks. A hyperlink is a portion of text or an image in one Web page that automatically addresses another page on the Web. By manipulating one's mouse to cause the screen pointer to move over the hyperlink and clicking the left mouse button, the page associated with that hyperlink is accessed via the Internet and is made to replace the previous page on one's computer screen.

The organization of Web pages relative to each other in accordance with hyperlinks in the HTTP protocol may be characterized as linear or tree-like. One may directly access any page on the Web simply by typing in its URL in the appropriate field of a Web browser. However, accessing Web pages through the use of hyperlinks, which, in practice, is the way most Web pages are accessed, is through a tree-like organization. That is, a first Web page contains a plurality of hyperlinks to other Web pages. Those other pages contain multiple hyperlinks to even further pages, and so on.

U.S. patent application Ser. No. 09/561,862 entitled "Method and Apparatus for Three Dimensional Internet and Computer File Interface", which is incorporated by reference herein, discloses a web browser that provides an interface to the Web that displays multiple Web pages simultaneously in a display mode that emulates three or four dimensional space. The browser provides its user a Web surfing experience like moving or navigating through a three or four dimensional space. While the method and apparatus disclosed in the aforementioned patent application is particularly adapted for use in connection with browsing the Web, it can also readily be applied to interfacing with any computer program on which a user might wish to open and view multiple files simultaneously, each in its own window or panel.

In accordance with aforementioned U.S. patent application Ser. No. 09/561,862, a plurality of related Web pages are organized and presented for view on a computer screen in an apparent three or four dimensional relationship to each other, as illustrated in FIG. 1. In one embodiment, five Web pages, labeled 1, 2, 3, 4, and 5, respectively, are displayed comprising center, top, bottom left, and right panels forming five inside faces of a cube. The sixth and last face of the cube corresponds to the view screen of the monitor and is not filled with a page. Accordingly, the operator of the computer has the impression that he is looking into the inside of a cube from one end of the cube.

Other Web browsers are known which allow the simultaneous display of multiple Web pages in other arrangements, e.g., a standard, two-dimensional, tile arrangement.

Many computer application software programs other than Web browsers also can simultaneously display multiple files, each in a different panel.

It is an object of the present invention to provide an improved graphical user interface tool for interfacing with a computer program that displays multiple panels simultaneously each corresponding to a different file or file portion which can be operated upon by the program independently of the files in other panels.

DETAILED DESCRIPTION OF THE INVENTION

In the terminology used in the present specification, the portions of the computer screen within which separate and/or independent information content may be displayed is termed a panel. Thus, in the terminology of the present specification, a page or file is the information content displayable in a panel. In connection with aforementioned U.S. patent application Ser. No. 09/561,862, the display format of which is used for exemplary purposes in this specification, and in which panels are organized to appear as the surfaces of a three dimensional cube or a four dimensional hypercube, the term "face" refers to a surface of the virtual cube or hypercube. Furthermore, in a preferred embodiment of the Web browser disclosed in U.S. patent application Ser. No. 09/561,862, all of the multiple, simultaneously displayed pages are active simultaneously. Therefore, for instance, the Web browser has provisions for direct interaction between the files/Web pages displayed in the panels, such as the ability to drag and drop a hyperlink from a page displayed in a first panel into a second panel in order to open the hyperlinked page in the second panel. Other operations that apply to multiple panels, such as REFRESH ALL (refresh all displayed pages) and HOME ALL (go to a predesignated page in each panel), are also enabled in accordance with that Web browser.

The present invention comprises a graphical user interface tool that presents the user with a series of optional actions that can be taken in connection with the file that is displayed within a panel of the display. In accordance with the invention, a user manipulates a cursor to a position in one of the multiple panels on the screen using a computer interface device, such as a mouse. The user then issues an instruction to invoke the tool of the present invention, such as by clicking on the right mouse button. The tool is associated with the panel in which it was invoked and, in a preferred embodiment, all of the actions that can be taken using the tool will be taken in the file displayed in the panel within which the tool was invoked and will not affect the other files displayed in other panels in the display.

Figure 2:
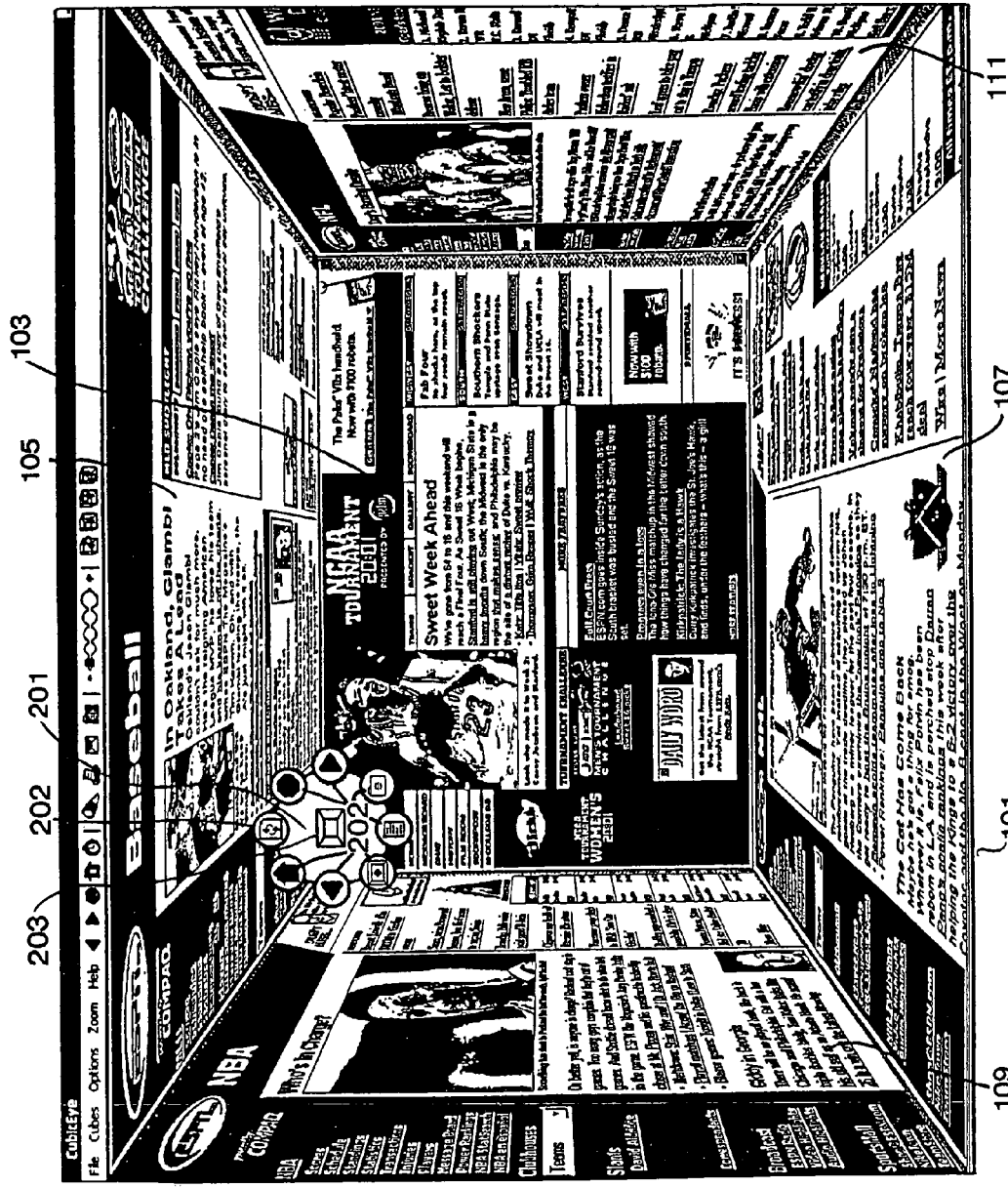
FIG. 2 is a view of a computer screen display in accordance with an embodiment of the present invention in which the graphical user interface tool of the invention has been invoked.

In accordance with a preferred embodiment of the invention, when invoked, the graphical user interface tool appears, for instance, centered on the position of the cursor at the moment the instruction was issued. FIG. 2 illustrates a computer screen display 101 on which is displayed from web pages 103, 105, 107, 109, and 111 in accordance with the Web browser disclosed in aforementioned U.S. patent application Ser. No. 09/561,862 in which the tool of the present invention has been invoked. The tool appears as an icon with multiple segments, each segment corresponding to one of the operations associated with the tool. For example, the icon take a generally circular form such as the daisy wheel 201 shown in FIG. 2, wherein each segment is a petal 202 of the daisy wheel that corresponds to an operation that can be taken pertinent to the file in the panel within which it was invoked, i.e., each petal is a button. While the icon may take any reasonable form, a circular icon with arc portions thereof corresponding to the different buttons, such as the daisy wheel 201 with petals 202 illustrated herein, has certain advantages that will become apparent from the description below. The actual actions that may be taken through use of the tool will depend on the program in connection with which it is used. In a preferred embodiment, once invoked, the operator may then reposition the daisy wheel to a more convenient location on the screen, such as by right clicking the mouse again within the daisy wheel and dragging and dropping it in another location.

Although the graphical representation of the tool (e.g., the daisy wheel) may be moved anywhere within the display, the tool is associated with the panel in which it was invoked and, in a preferred embodiment, all of the actions that can be taken using the tool will be taken in the file displayed in the panel within which the tool was invoked and will not affect the other files displayed in other panels in the display.

Figure 3:
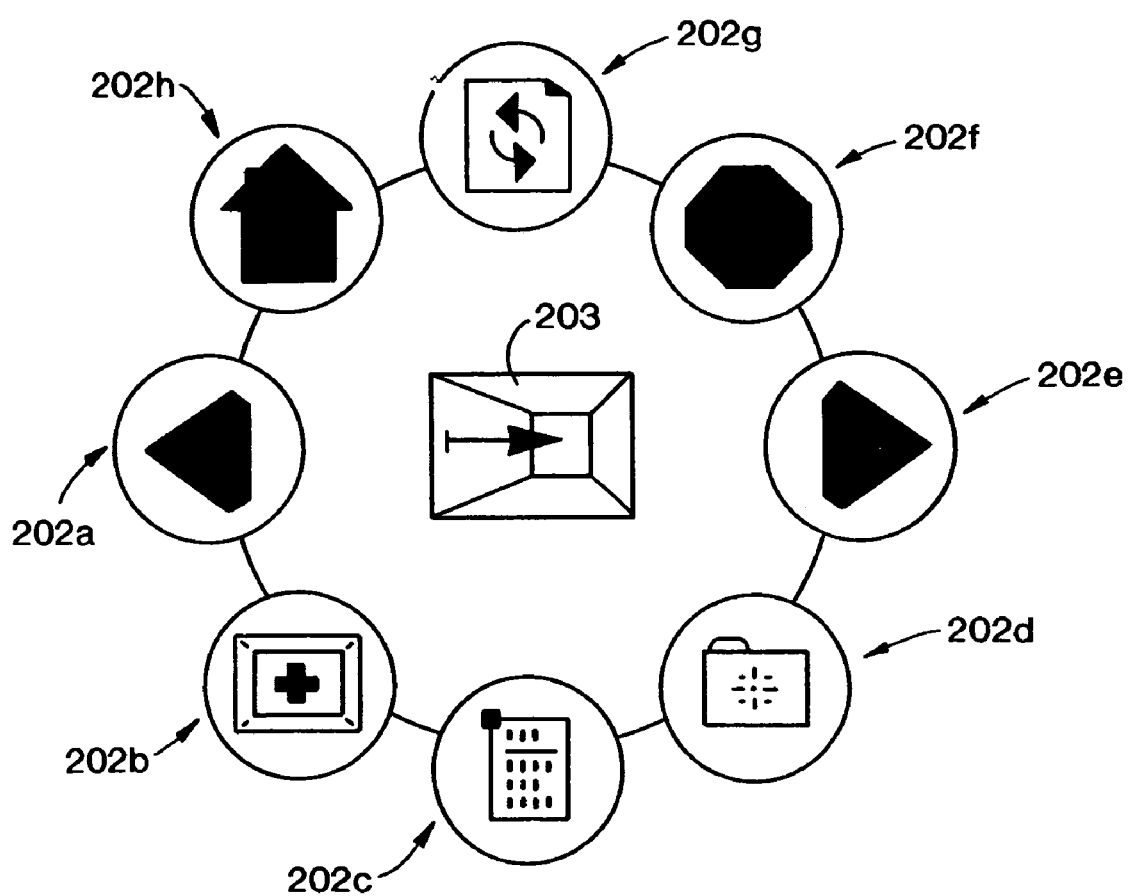
FIG. 3 is a view of a computer screen display in accordance with an embodiment of the present invention in which the graphical user interface tool of the invention has been invoked and illustrating a further feature of the tool.

FIG. 3 is an enlarged pictorial of the tool shown in FIG. 2 disembodied from the computer display screen in order that it may be more easily seen.

Each of the petals of the daisy wheel corresponds to a pertinent action that can be taken with respect to the relevant panel, e.g., CUT, COPY, PASTE, ADD TO FAVORITES, BACK (e.g., return to previous page). The user may manipulate the cursor over the petal corresponding to the action the user wishes to utilize and left click the mouse to cause that action to be run. Preferably, when the cursor is positioned over a particular petal, the appearance of that petal is altered in order to more clearly indicate to the user which petal/button/operation is tentatively selected based on the position of the cursor before the user clicks the mouse button to actually select that operation.

Figure 4:
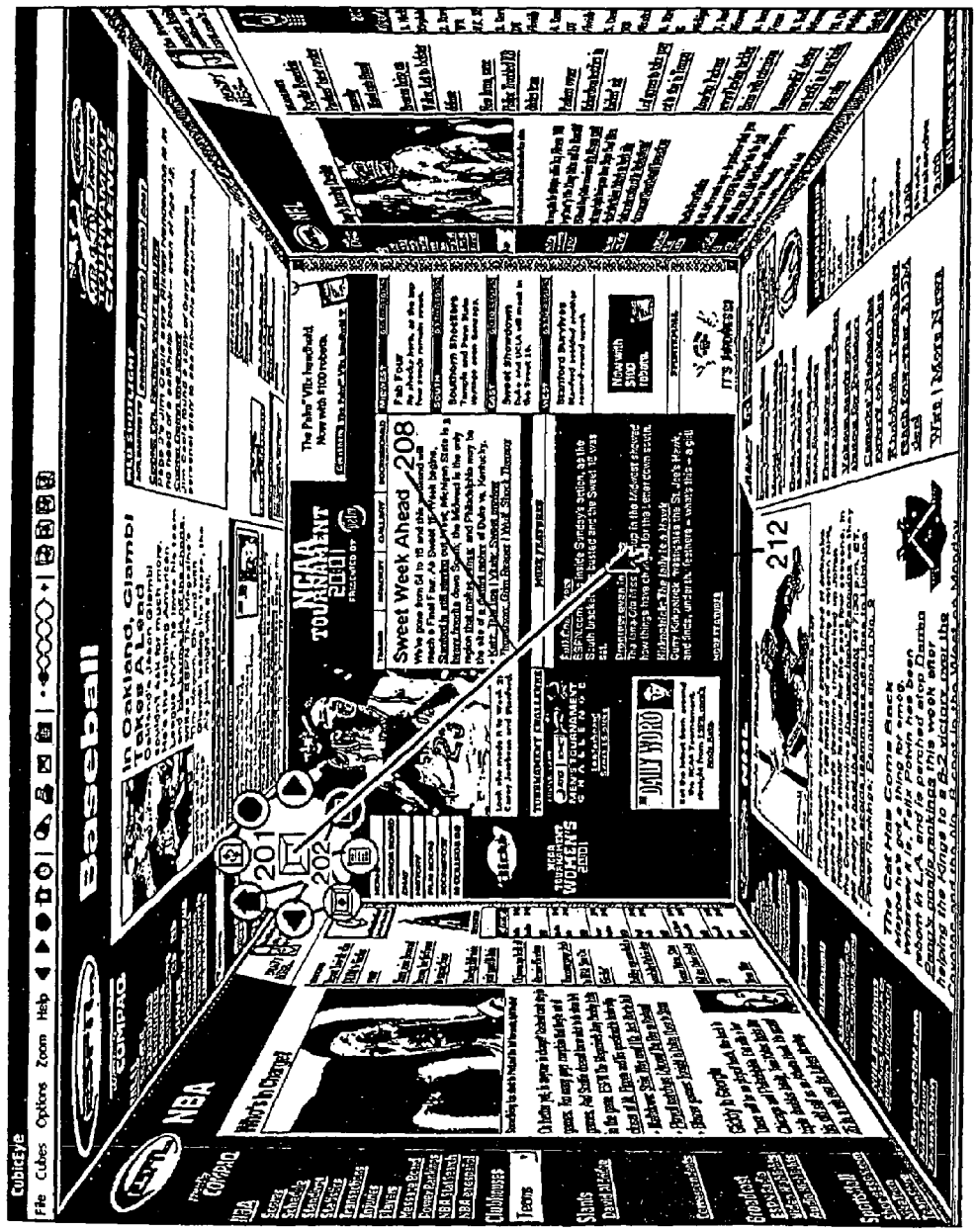
FIG. 4 is a drawing of the graphical user interface tool in accordance with an embodiment of the present invention.

In a preferred embodiment of the invention illustrated in FIG. 4, once the daisy wheel 201 is invoked, a line 208 is shown between the center of the daisy wheel and the cursor 212. The line moves as the operator moves the cursor 212. Accordingly, as the cursor is moved about the screen, the line 208 between the center of the daisy wheel and the cursor will always intersect one petal 202 of the daisy wheel 201 (unless the cursor is moved to the center of the daisy wheel). Preferably, whichever petal 202 is intersected by the line 208 is caused to change appearance slightly (e.g., become slightly enlarged or become slightly brighter or darker or change color as illustrated in connection with petal 202d) so that the user can more easily determine which petal/button/operation is tentatively selected. This feature allows for proper selection of petals with less of a requirement for manual dexterity of the user.

In a preferred embodiment, the user selects a petal by moving the mouse as just described so that the line intersects the petal of interest and then left clicks the mouse to cause the corresponding action to be taken regardless of whether the cursor itself is actually positioned within the petal. These features make it easy to select a petal and thus allow the daisy wheel tool to be made smaller than might otherwise be reasonable without requiring an excessive amount of manual dexterity to use the tool.

The software in accordance with the present invention then executes the selected action. In the preferred embodiment of the invention, the actions taken will be performed only in connection with the file in the panel within which the daisy wheel was invoked.

In one embodiment, the actions corresponding to each petal of the daisy wheel are the same regardless of the panel within which it was invoked. However, in other embodiments, the operations to which the petals of the daisy wheel correspond may vary depending on the particular panel in which the daisy wheel was invoked. For instance, one panel may correspond to a Web page or portion of a program to which certain operations are pertinent, whereas another panel that is being displayed simultaneously may have different actions that are pertinent to the file displayed in that panel.

Accordingly, when the daisy wheel is invoked in the other panel, the petals of the daisy wheel may correspond to different actions. The actions corresponding to some, all or none of the petals may change depending on the panel within which it is invoked.

Preferably each petal bears an icon indicative of the action that corresponds to that petal. Alternately, it may contain a word, such as CUT, COPY, PASTE, BACK, FORWARD, FAVORITES, that is indicative of the corresponding action.

In the example of FIG. 2, five Web pages are displayed simultaneously in an arrangement which emulates five of the six inside faces of a cube. In this example, let us assume that the user has invoked the daisy wheel 201 in the left panel 211 by positioning the cursor in the left panel 211 and right clicking the mouse to invoke the daisy wheel. The operator has then moved the wheel to a more convenient location in which it is positioned toward the left edge of the central panel 205 (the position shown in FIG. 2) so that the left panel can be freely viewed without the daisy wheel covering part of that panel.

Activation of any of the buttons (i.e., the petals) of the wheel will cause an action to be taken by the Web browser software that affects only that panel. Preferably, the daisy wheel includes an indication of the panel within which it was invoked so that the operator may move it into another panel, either partially or entirely, without losing track of the panel within which the wheel was invoked. In the exemplary embodiment of the figures, the icon in the center of the daisy wheel indicates the panel within which it has been invoked. Particularly, the indication is by way of an icon that shows a miniature representation of five panels as arranged in the actual display with the panel that corresponds to the panel within which the wheel has been invoked darkened relative to the other panels.

In the exemplary embodiment of the figures, we shall assume that the program within which the tool of the present invention is embodied is the Web browser of aforementioned U.S. patent application Ser. No. 09/561,862, which Web browser allows the simultaneous display of multiple Web pages in an apparent three dimensional arrangement. A first petal, 202a, corresponds to a typical BACK button in a Web browser, i.e., reload the Web page that was most recently previously displayed in that panel.

Button 202b is a ZOOM button (to be described in greater detail below). Button 202c is a page function button (to be described in greater detail below), button 202d is a FAVORITES button which allows the user to add the Web page URL to a favorites list. Button 203e is a FORWARD, i.e., reload the page displayed immediately before the last operation of the BACK button. Button 203f is a STOP button which stops the loading of the page. Button 203g is a REFRESH button which causes the browser to reload the page. Finally, button 203h is a HOME button which causes the browser to load that panel with a Web page which the user has predesignated as a HOME page.

In one embodiment of the invention particularly adapted for use with the three or four dimensional presentation scheme of aforementioned U.S. patent application Ser. No. 09/561,862, the center of the daisy wheel also may comprise a button 202i that corresponds to an action, namely, ROTATE the display such that the panel within which the daisy wheel was invoked is moved to the center panel of the display while all other panels are moved correspondingly to retain the same virtual spatial relationship among the faces/Web pages. For instance, note that, in the exemplary embodiment shown in the figures, the center icon also comprises an arrow pointing from a darkened panel to the central panel (the darkened panel indicating the particular panel within which the daisy wheel was invoked, as previously described). This icon is indicative of the operation that can be performed by selecting the center button, namely, rotating the left panel into the central panel.

In an alternative embodiment, the operation corresponding to the center of the daisy wheel could simply swap the page shown in the panel within which the daisy wheel was invoked with the page shown in the center panel (thus changing the apparent spatial relationship of the pages). This is a less preferred embodiment, since the theoretical spatial relationship of the pages to each other will be changed, which is contrary to the concepts expressed in the aforementioned patent application. In a further alternative embodiment, one or both of these options may be presented to the user in the petals of the daisy wheel rather than in a center button.

Figure 1:
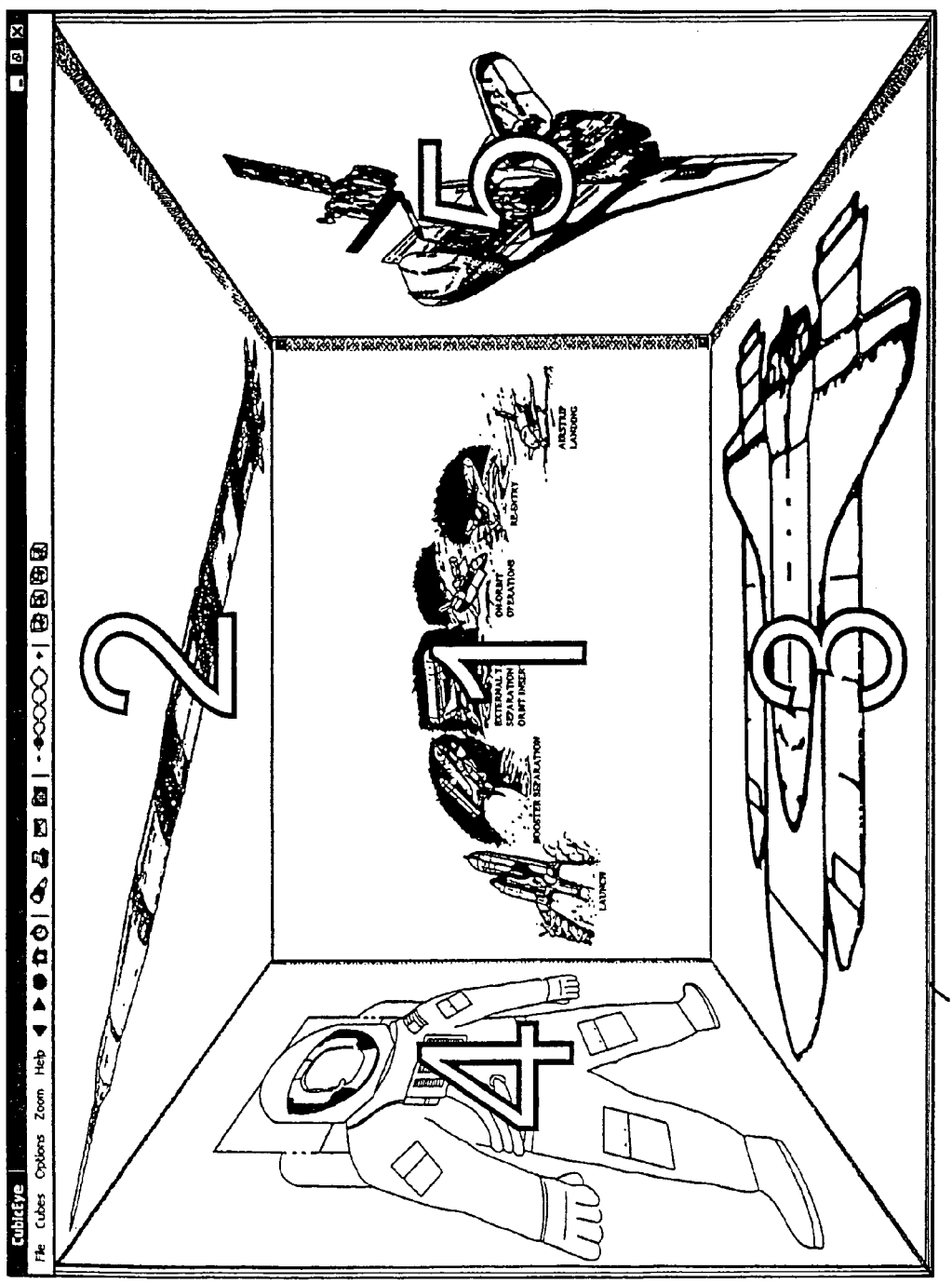
FIG. 1 is a view of a computer screen display in accordance with an embodiment of the present invention.

Note, however, that this optional ROTATE button preferably is omitted from the daisy wheel, and instead is provided elsewhere in the display, such as in a tool bar positioned at the top of the screen. The reason it is believed preferable to provide the ROTATE button elsewhere is because one of the primary themes of the daisy wheel concept is that the functions provided on the daisy wheel correspond only to the file/page shown in the panel within which it was invoked. Rotating the virtual space or even just swapping pages between two panels is inconsistent with this paradigm in that it involves multiple pages, not a single page. Nevertheless, this is a useful feature and it may, ultimately, be more user-friendly to implement it in the daisy wheel rather than elsewhere, despite the conceptual incongruity. In one form, ZOOM may correspond to enlarging the center page to fill the entire screen (zoomed in) or showing five panels as shown in FIGS. 1 and 2 (zoomed out).

Figure 5:
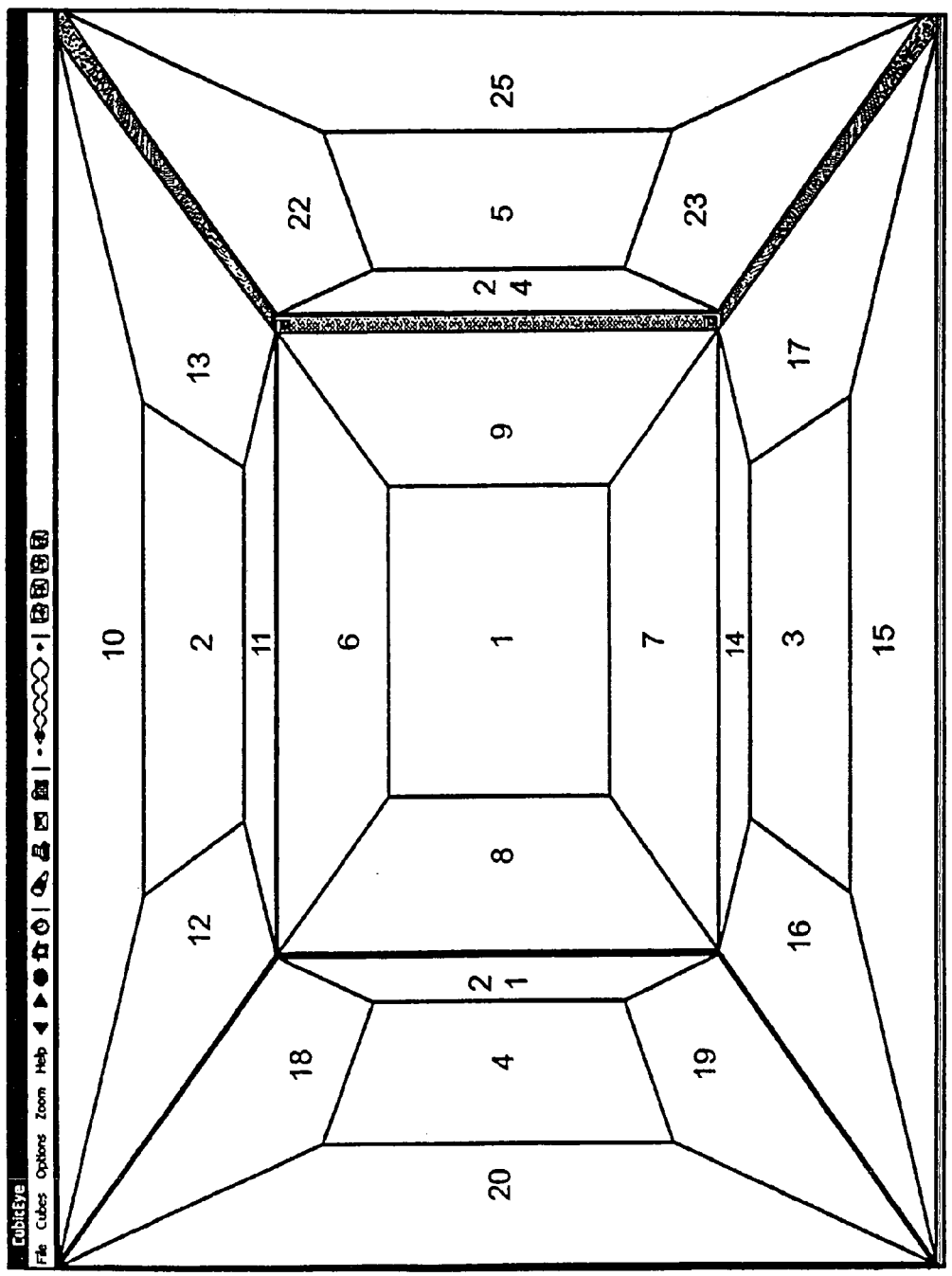
FIGS. 5 and 6 are first and second views of a computer screen display illustrating a particular feature of the present invention.

In an alternative embodiment in which more than two levels of zooming are made available, zooming out corresponds to taking increasingly wider perspective views of the theoretical three or four dimensional space comprised of the Web pages, while zooming in corresponds to taking an increasingly smaller perspective. Thus, if one is presently viewing a display comprising five panels as shown in FIG. 2, zooming out generates a display showing twenty-five panels arranged to appear as five cubes, each comprising five faces/panels such as illustrated in FIG. 5. The five central panels 1, 6, 7, 8, 9 of the display of FIG. 5 comprises the five panels from FIG. 5. Keeping with the spatial analogy, the other twenty panels 2–4 and 10–25 comprise five faces of four cubes which surround the cube from FIG. 2 and which is now the central cube of FIG. 5. Zooming out again generates the display of FIG. 6 in which one-hundred and twenty-five panels, 1–125 are displayed comprising five faces of each of the five cubes shown in FIG. 5 plus five faces of each of four cubes surrounding each of those five cubes.

Zooming in corresponds to the opposite actions, i.e., moving from a view showing one-hundred and twenty-five panels to a view showing twenty-five panels to a view showing five panels to a view showing only the central panel.

In yet another embodiment, the ZOOM button(s) may perform an entirely different function, albeit one for which the term "zoom" is still appropriately descriptive. In this embodiment, zooming in can correspond to moving into a cube as that concept is described in aforementioned U.S. patent application Ser. No. 09/561,862. Particularly, utilizing the three or four dimensional analogy described in the aforementioned patent application, moving or zooming into a face of a cube can correspond to moving within the cube corresponding to that face, which cube may theoretically be considered to comprise a plurality of smaller cubes filling up the space of that cube. Logically, the analogy of moving into a cube to view a set of smaller cubes can correspond to a greater level of detail. For instance, if a web site constitutes a collection of web pages comprising a virtual tour of a real or fictitious museum, zooming into a panel can correspond to moving to a level of greater detail. Thus, for instance, if the various web pages currently being displayed correspond to different rooms of a museum, zooming into one of those rooms can lead to a new set of panels corresponding to the paintings in that room. Zooming into one of those panels representing a particular painting may bring up a new series of panels having detailed information about the painting or the artist.

The operation corresponding to the ZOOM button, 202b can take several forms. In the exemplary embodiment shown in the figures, a single button, 202b, is designed as a toggle, e.g., there are only two ZOOM positions (e.g.,zoomed in and zoomed out). Thus, a single button can be used to perform both functions. When the present condition is zoomed in, then operation of button 202b zooms in. In other embodiments, especially those in which one may zoom in the out more than two levels, two separate petals may be provided, one for ZOOM IN and one for ZOOM OUT.

Figure 6:
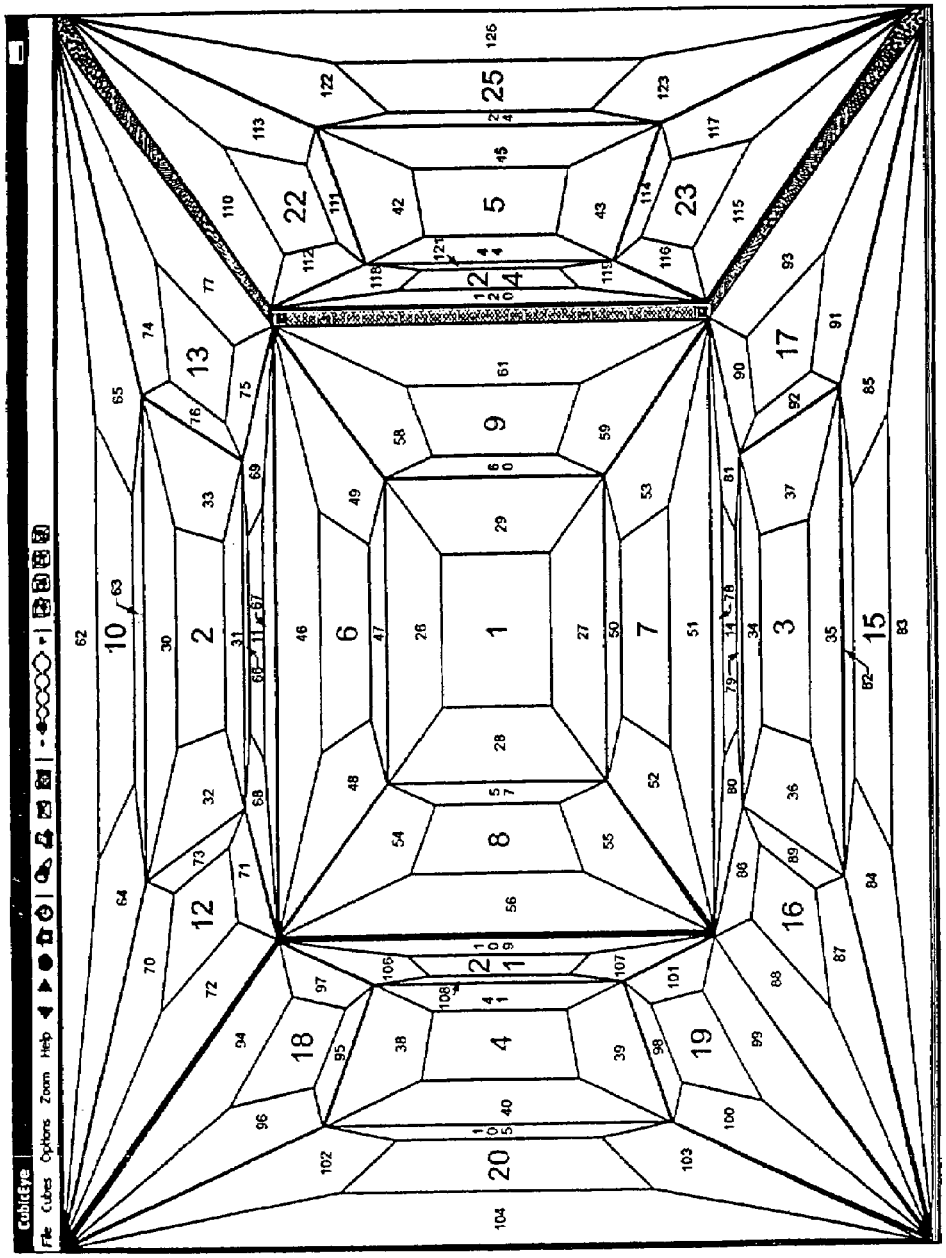
Figure 7:
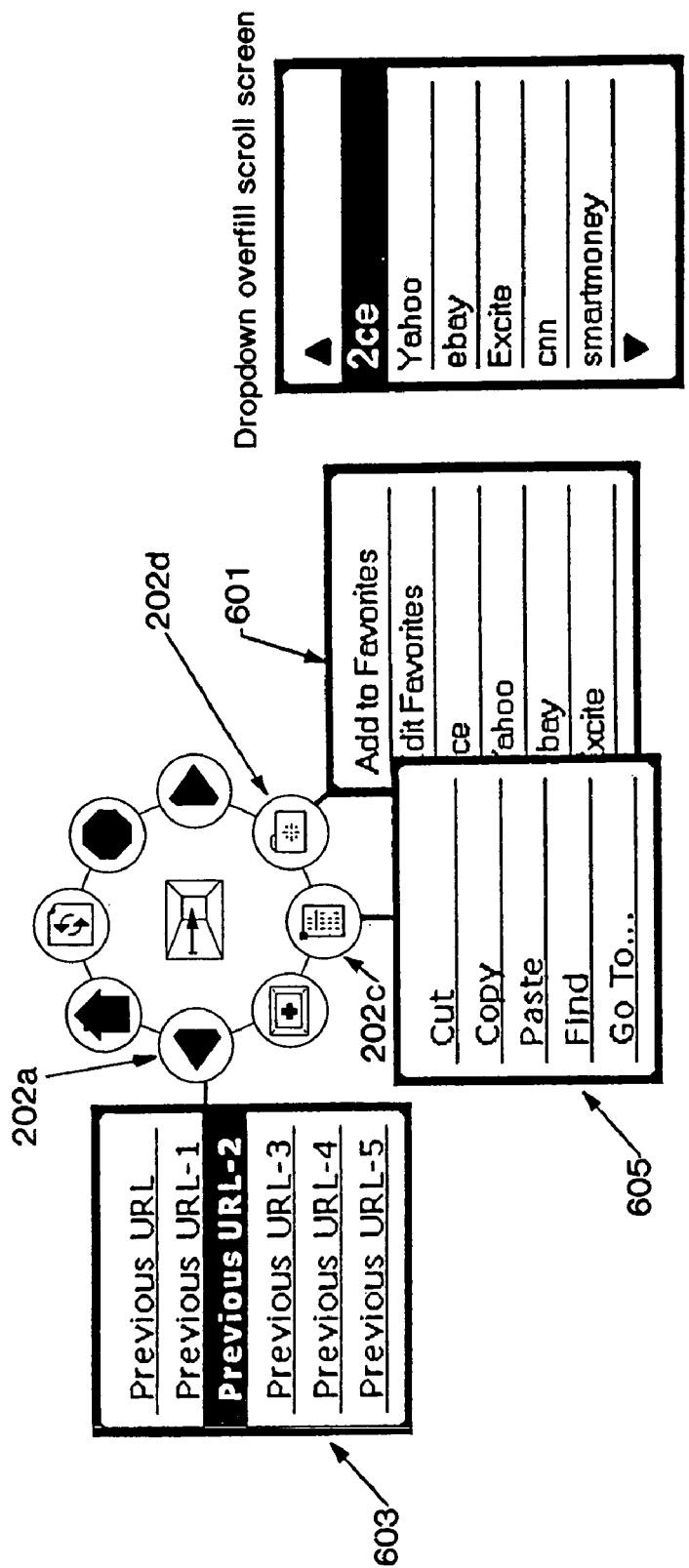
FIG. 7 is a view of a graphical user interface in accordance with a second embodiment of the present invention.

While the invention has heretofore been described in connection with an embodiment in which each petal or button on the daisy wheel responds to a single action, alternately, operation of any one or more of the buttons may invoke a pop up menu that provides several related actions that the user may further select amongst. For instance, FIGS. 6 and 7 illustrate pop up menus 601, 602, 603, 604, 605 that might correspond to buttons 202a (BACK), 202c (PAGE Functions) and 202d (FAVORITES). Clicking on any one of those petals may cause a menu to appear corresponding to that petal. For instance, by clicking on the PAGE function petal 202c, the user may be presented with menu 605 which presents a collection of options, such as CUT, COPY, PASTE, FIND, and GO TO, that are conceptually related (in that each is generally considered an editing type function). As another example, the FAVORITES button 203d, instead of executing the single instruction "Add to Favorites", may present the user with a menu of options 601 associated with the FAVORITES function. Thus, as shown in FIG. 7, the user may be presented with the options of adding the current page to a FAVORITES list, editing the FAVORITES list, and being presented with the present contents of the FAVORITES list such that the user can move the cursor over one of those FAVORITES and mouse click in order to cause that particular Web page to be loaded into the panel within the daisy wheel was invoked.

Figure 8:
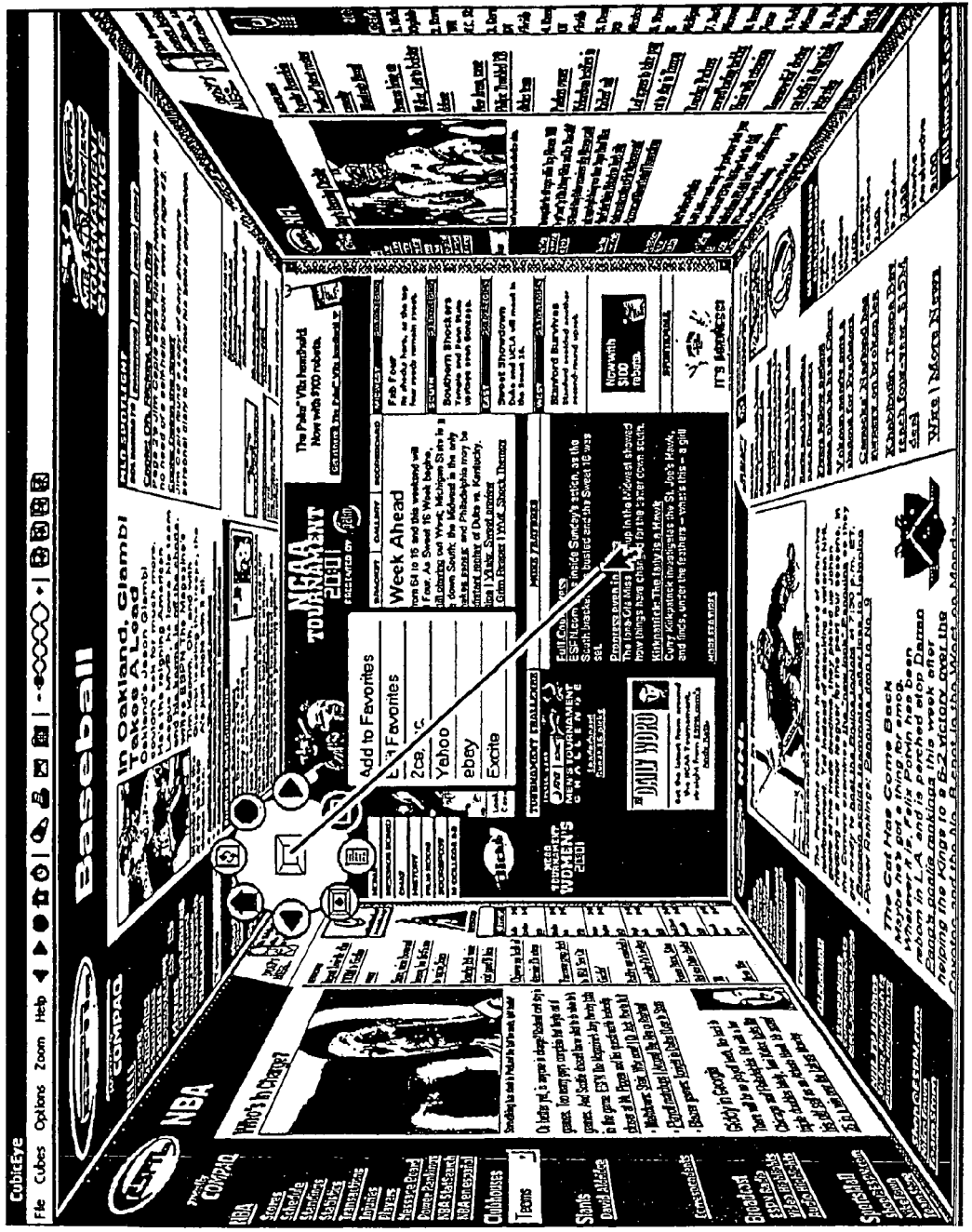
FIG. 8 is a view of a computer screen display in accordance with an embodiment of the present invention in which the graphical user interface tool of the invention has been invoked and illustrating a further feature of the tool.

Those of skill in the art will recognize that, in a most practical embodiment, only one pop up menu is allowed to appear at a time, namely, the one corresponding to the last button/petal to be selected, such as shown in FIG. 8. FIG. 4 shows multiple menus merely in order to illustrate some of the menus that might correspond to petals 202a, 202c and 202d, respectively.

In one embodiment of the invention, the menus may pop up whenever the line between the center of the daisy wheel and the cursor intersects the corresponding petal. In another embodiment, the user may need to take an additional action to select a petal, such as right clicking with the mouse while the line intersects a petal in order to cause the corresponding menu to appear.

Preferably, the user can customize the daisy wheel graphical user interface tool such as by any one or more of (1) choosing which functions are provided on it, (2) choosing how many petals/buttons are on it, (3) choosing the icons used on the petals to designate their functions, (4) choosing a default size of the daisy wheel, and (5) choosing a skin for the daisy wheel.

Figure 9:
FIG. 9 is a view of a computer screen display in accordance with an embodiment of the present invention in which the graphical user interface tool of the invention has been invoked and illustrating a further feature of the tool.

In accordance with another aspect of the present invention, the actions available through the daisy wheel are simultaneously provided through a horizontal tool bar as illustrated at 931 in FIG. 9, which tool bar is always displayed. In this manner, the user need not invoke the daisy wheel if inconvenient. Preferably, the horizontal tool bar appears at the top edge of the center panel regardless of the panel to which its actions will be applied and includes an additional button for selecting the panel to which the tool bar actions will apply. For instance, it may include an icon like icon 202i, in which the user may click on one of the miniature panels to indicate the selected panel and that miniature panel will be darkened to provide a reminder of the selected panel. Further, the user may be allowed to reposition the tool bar anywhere on the display using drag and drop operations as previously described in connection with moving the daisy wheel.

While the graphical user interface tool of the present invention has been described in connection with use on a computer monitor, it also can be used in connection with any form of display, including a heads-up display system that presents a more realistic three-dimensional view or any other computer interface technology that may provide a more realistic three or four-dimensional interface to the computer. Further, while the invention has been described in connection with one embodiment in which it is incorporated into a Web browser, it may be incorporated into any number of programs, including any program that allows a user to display several files in different panels simultaneously.

Having thus described a few particular embodiments of the invention, various alterations, modification, and improvements, will readily occur to those skilled in the art. Such alternations, modifications, and improvements as are made obvious in this disclosure are intended to be part of this description though not expressly stated herein and are intended to be within the spirit and scope of the invention. Accordingly, the foregoing description is by way of example only, and not limiting.

The invention claimed is:

1. A graphical user interface tool for use in connection with a computer program which can simultaneously display multiple files on a computer display device, each file appearing in a different panel on said display device, said tool comprising: means for allowing a user to invoke said tool in association with a selected one of said multiple files using a computer interface device; means for causing a graphic representation of said tool to appear on said display device responsive to being invoked by said user, said graphic representation comprising an icon having a plurality of portions, each corresponding to an operation that can be performed in connection with said selected file; means for allowing said user to select one of said plurality of operations using a user interface device: wherein said means for allowing said user to select one of said operations is responsive to said user positioning said cursor in a position indicative of a particular segment of said icon to tentatively select said operation corresponding to said segment and performing a subsequent act to select said operation corresponding to said segment; means for causing a line to appear on said display device, when icon appears on said display device, said line having a first end point centered on said icon and a second endpoint at said cursor; and means for causing said operation to be performed on said selected file.

2. The tool of claim 1 wherein said plurality of operations differ depending on the selected file.

3. The tool of claim 1 wherein said icon is circular and said segments comprise arc portions of said circular icon.

4. The tool of claim 1 further comprising: means for causing said icon to appear in said panel associated with said selected file.

5. The tool of claim 1 wherein said computer program is a Web browser and said files are Web pages accessed by said Web browser.

6. The tool of claim 1 wherein the act of said user positioning said cursor such that said line intersects one of said segments comprises tentatively selecting said operation corresponding to said segment.

7. The tool of claim 6 wherein said icon is circular and said segments comprise arc portions of said circular icon arranged such that said line cannot intersect more than one of said arc portions simultaneously.

8. The tool of claim 7 wherein, when said line intersects a one of said segments, the appearance of said intersected segment is altered to visually distinguish it from the other said segments that are not tentatively selected.

9. The tool of claim 1 wherein said icon further comprises a portion that indicates which of said plurality of panels is said associated panel.

10. The tool of claim 9 wherein said portion is in the center of said icon.

11. The tool of claim 10 wherein one of said operations is transferring said selected file from said panel associated with said selected file to a predetermined other one of said panels.

12. The tool of claim 11 wherein said transferring operation comprises transferring said selected file to said predetermined other panel and transferring said file displayed in said predetermined other panel to said associated panel.

13. The tool of claim 3 wherein said icon of said tool further comprises a separate horizontal toolbar that duplicates the functionality of said icon.

14. The tool of claim 13 wherein, responsive to said tool being invoked, said horizontal toolbar always appears at a same predetermined position in said display device.

15. The tool of claim 1 wherein said multiple files are simultaneously active.

16. A method of interfacing with a computer program that can simultaneously display multiple files on a computer display device, each file appearing in a different panel on said display device, said method comprising the steps of: allowing a user to invoke said tool in association with a selected one of said multiple files using a computer interface device, causing a graphic representation of said tool to appear on said display device responsive to being invoked by said user, said graphic representation comprising an icon having a plurality of segments, each corresponding to an operation that can be performed in connection with said selected file; allowing said user to select one of said plurality of operations using a user interface device; wherein said step of allowing said user to select one of said operations is responsive to said user positioning said: cursor in a position indicative of a particular segment of said icon to tentatively select said operation corresponding to said segment and performing a subsequent act to select said operation corresponding to said segment; causing a line to appear on said display device, when icon appears on said display device, said line having a first end point centered on said icon and a second endpoint at said cursor; and causing said operation to be performed on said selected file.

17. The method of claim 16 wherein said plurality of operations differ depending on the selected file.

18. The method of claim 16 wherein said icon is circular and said segments comprise arc portions of said circular icon.

19. The method of claim 16 further comprising: means for causing said icon to appear in said panel associated with said selected file.

20. The method of claim 16 wherein said step of allowing a user to invoke said tool in association with said selected file associates said tool with said file displayed in said panel within which said cursor was positioned when said tool was invoked and wherein said method further comprises the step of: allowing said user to move said icon outside of said panel associated with said selected file without switching said selected file.

21. The method of claim 16 wherein the act of said user positioning said cursor such that said line intersects one of said segments comprises tentatively selecting said operation corresponding to said segment.

22. The method of claim 21 wherein said icon is circular and said segments comprise arc portions of said circular icon arranged such that said line cannot intersect more than one of said arc portions simultaneously and wherein, when said line intersects a one of said segments, the appearance of said intersected segment is altered to visually distinguish it from said segments that are not tentatively selected.

23. The method of claim 16 wherein said icon further comprises a portion that indicates which of said plurality of panels is associated with said selected file.

24. The method of claim 23 wherein said portion is in the center of said icon.

25. The method of claim 16 wherein one of said operations is transferring said selected file from said panel associated with said selected file to a predetermined other one of said panels.

26. The method of claim 25 wherein said transferring operation comprises the steps of: transferring said selected file to said predetermined other panel; and transferring said file displayed in said predetermined other panel to said panel.

27. The method of claim 18 wherein said icon of said tool further comprises a separate horizontal toolbar that duplicates the functionality of said icon.

28. The method of claim 27 wherein, responsive to said tool being invoked, said horizontal toolbar always appears at a same predetermined position in said display device.

* * * * *